United States Patent
Lux

(10) Patent No.: US 9,810,031 B2
(45) Date of Patent: Nov. 7, 2017

(54) COILED TUBING OPTIMIZED FOR LONG, HORIZONTAL COMPLETIONS

(71) Applicant: Global Tubing, LLC, Dayton, TX (US)

(72) Inventor: Neal A. Lux, The Woodlands, TX (US)

(73) Assignee: Global Tubing LLC, Dayton, TX (US)

( * ) Notice: Subject to any disclaimer, the term of this patent is extended or adjusted under 35 U.S.C. 154(b) by 0 days.

(21) Appl. No.: 15/264,912

(22) Filed: Sep. 14, 2016

(65) Prior Publication Data
US 2017/0002614 A1 Jan. 5, 2017

Related U.S. Application Data

(63) Continuation of application No. 13/611,512, filed on Sep. 12, 2012, now Pat. No. 9,528,327.

(60) Provisional application No. 61/538,276, filed on Sep. 23, 2011.

(51) Int. Cl.
 *E21B 17/20* (2006.01)
 *F16L 13/02* (2006.01)
 *B23K 9/00* (2006.01)

(52) U.S. Cl.
 CPC .............. *E21B 17/20* (2013.01); *B23K 9/00* (2013.01); *F16L 13/02* (2013.01)

(58) Field of Classification Search
 CPC ............. E21B 17/20; B23K 9/00; F16L 13/02
 See application file for complete search history.

(56) References Cited

U.S. PATENT DOCUMENTS

| | | | |
|---|---|---|---|
| 677,712 | A | 7/1901 | Stapf |
| 4,603,806 | A | 8/1986 | Watanabe et al. |
| 4,629,218 | A | 12/1986 | Dubois |
| 4,863,091 | A | 9/1989 | Dubois |
| 5,191,911 | A | 3/1993 | Dubois |
| 5,456,405 | A | 10/1995 | Stagg |
| 5,590,915 | A | 1/1997 | Recalde |
| 5,662,145 | A | 9/1997 | Stagg |
| 5,743,301 | A | 4/1998 | Winship |
| 5,921,285 | A | 7/1999 | Quigley et al. |
| 5,924,316 | A | 7/1999 | Streubel et al. |
| 6,339,945 | B2 | 1/2002 | Miller et al. |
| 6,367,557 | B1 | 4/2002 | Rosine et al. |
| 6,527,056 | B2 | 3/2003 | Newman |
| 6,842,957 | B2 | 1/2005 | Van Giezen |
| 7,090,309 | B2 | 8/2006 | Blessing et al. |
| 7,107,682 | B2 | 9/2006 | Hauger |

(Continued)

FOREIGN PATENT DOCUMENTS

WO 03026827 A1 4/2003

*Primary Examiner* — Donnell Long
(74) *Attorney, Agent, or Firm* — Patterson & Sheridan, LLP

(57) ABSTRACT

Coiled tubing optimized for long, horizontal completions is provided. The tubing comprises a body portion; at least two tapered portions, each tapered portion defining distal ends spaced apart from one another; and at least one bias weld portion. In some embodiments, the tapered portions are located between the body portion and the bias weld. The tubing has a weld thickness in the bias weld portion(s), a body thickness in the body portion, and a taper thickness in the tapered portions; generally, the thickness of the bias weld portion is greater than the body portion thickness. The wall thickness transitions from one end of each tapered portion to the other end of the same tapered portion.

20 Claims, 3 Drawing Sheets

(56) References Cited

U.S. PATENT DOCUMENTS

| | | |
|---|---|---|
| 7,418,849 B2 | 9/2008 | Hauger et al. |
| 7,637,135 B2 | 12/2009 | Homig et al. |
| 8,245,734 B2 | 8/2012 | Jahani et al. |
| 2002/0192495 A1 | 12/2002 | Toyooka et al. |
| 2003/0008171 A1 | 1/2003 | Toyooka et al. |
| 2005/0189029 A1 | 9/2005 | Quigley et al. |
| 2006/0243453 A1 | 11/2006 | McKee |
| 2008/0210329 A1 | 9/2008 | Quigley et al. |

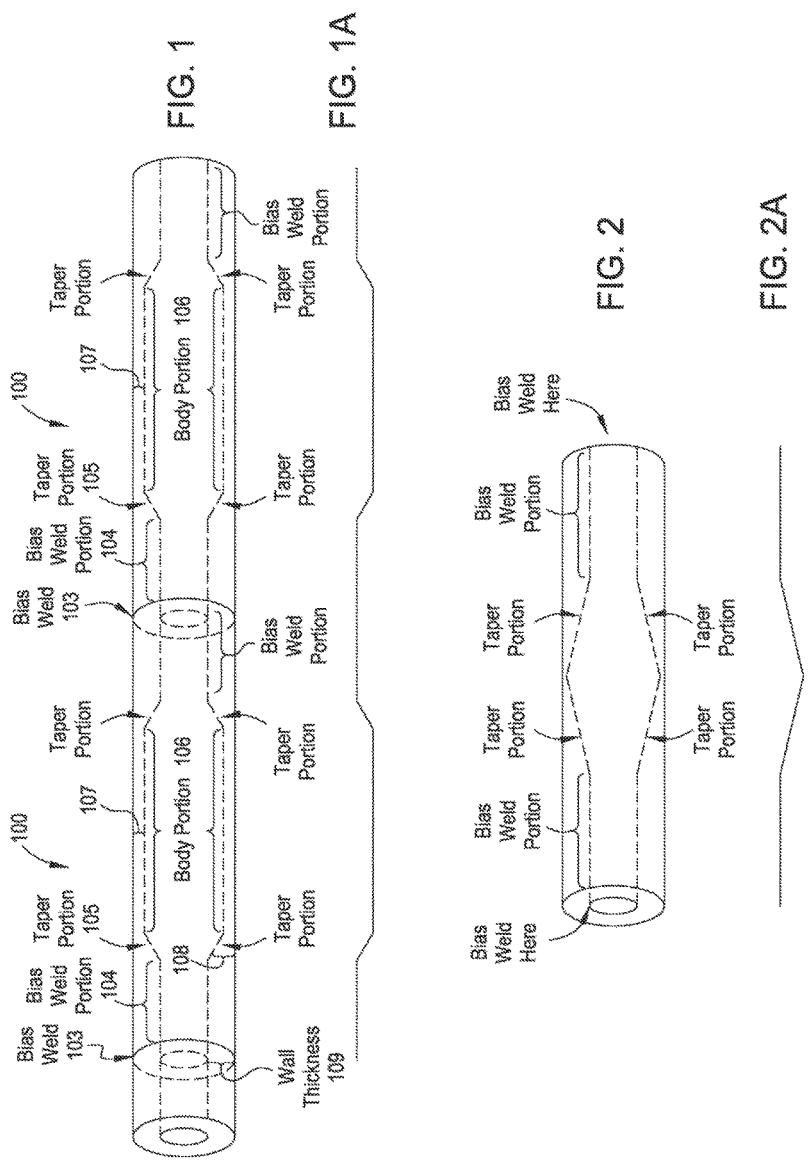

COILED TUBING OPTIMIZED FOR LONG, HORIZONTAL COMPLETIONS

CROSS REFERENCE TO RELATED APPLICATIONS

This application is a continuation of U.S. patent application Ser. No. 13/611,512, filed Sep. 12, 2012, which claims benefit of U.S. Provisional Patent Application No. 61/538,276, filed Sep. 23, 2011, the contents of which are herein incorporated by reference in their entirety.

BACKGROUND

Field

The present invention relates generally to coiled tubing, and in a particular though non-limiting embodiment, to methods and means of increasing the life of bias welds in coiled tubing.

Description of the Related Art

Coiled Tubing (CT) is frequently used in the completion of long, horizontal oil and gas wells. These wells have horizontal sections ranging from about 2,000 to about 10,000 feet and they are increasing rapidly in length over time. The operating conditions require CT with an outer diameter (OD) of at least about 2.000 inches, wall thickness (WT) of at least about 0.156 inch, and steel tubing with a specified minimum yield strength (SMYS) of at least about 90,000 psi.

As those of skill in the relevant arts will readily appreciate, CT is a consumable that is sold in discrete lengths known as "strings," and each CT string has a finite lifespan. The life of the CT string in long horizontal wells is primarily governed by the durability of the helical strip joining weld known as the "bias weld."

A typical CT string used in such wells will have between about 10 and about 20 bias welds within it. Bias welds are the weakest point of the CT string and are modeled to have a life that is about 80% of the life of areas of the CT string without bias welds. The basis for modeling 80% life was determined in a 1995 joint industry study on plastic fatigue when CT strings were used only in vertical wells.

However, long, horizontal wells have operating conditions that create unique stresses on CT strings and bias welds in particular. These stresses, such as helical and sinusoidal buckling, are in addition to the typical plastic strain CT strings encounter in vertical wells. To improve the economics of CT usage in long, horizontal wells it is imperative that the life of bias welds is increased.

The life of a bias weld is controlled by many variables, but WT has the largest impact. For a typical string used in long, horizontal wells, a 17% increase in WT leads to a 78% increase in bias weld life. As the WT increases so does the overall weight of the CT string. The units that carry and deploy CT strings have structural and/or regulatory weight limits.

To stay within weight limits, CT service companies must limit either WT or CT string length. Decreasing the CT string length reduces the market potential and profit margin for that CT string. For example, in the United States, a 15,000 foot CT string may only be utilized a third as much as a 19,000 foot CT string. Therefore, most service companies sacrifice bias weld life for longer CT strings.

There is, therefore, a long-standing yet unmet need for improved methods and means of increasing the life of bias welds in coiled tubing used in long, horizontal wells, which are still economical on a commercial scale.

SUMMARY

In one example embodiment, a section of a coiled tubing is provided, the section including a body portion having at least two tapered portions, with the tapered portions defining two distal ends spaced apart from one another, and each distal end having a wall thickness greater than any other minimum wall thickness within the body portion. In other embodiments, the section further includes at least one bias weld portion. In a further embodiment, the length of the section's body portion is longer than the length of the bias weld portion, and in a still further embodiment the section includes at least two body portions. In another embodiment, the section includes least two bias weld portions. In one example embodiment, a section's body portion thickness is about 0.190 inches, whereas in others the body portion thickness is either greater than or less than about 0.190 inches. In further embodiments, the body portion thickness transitions between a first end of a tapered portion and a second end of a tapered portion. In still further embodiments, the section has a bias weld thickness is about 0.204 inches, whereas in others the section has a bias weld thickness of either greater than or less than about 0.204 inches. In a presently contemplated commercial embodiment, the section of coiled tubing is suitable for use as a section of a longer coiled tubing string. In some embodiments, the length of the bias weld portion is about 150 feet in length, whereas in others the length of the bias weld portion is either greater than or less than about 150 feet in length.

In another embodiment, a section of coiled tubing is provided, said section comprising a body portion having at least two tapered portions, the tapered portions defining two distal ends spaced apart from one another, wherein each distal end has a wall thickness greater than any other minimum wall thickness within the body portion; and at least one bias weld portion, wherein the length of the body portion is longer than the length of the bias weld portion. In some embodiments, a minimum wall thickness located elsewhere within the body portion is about 0.175 inches, while in other embodiments the minimum wall thickness is either greater than or less than about 0.175 inches. In further embodiments, the section includes at least two bias weld portions. In still further embodiments, the section of coiled tubing is suitable for use as a section of a longer coiled tubing string.

BRIEF DESCRIPTION OF THE DRAWINGS

For a further understanding of the nature, objects, and advantages of the present invention, reference should be made to the following drawings, wherein:

FIG. 1 is a cross-sectional view of a section of coiled tubing according to a first example embodiment of the invention.

FIG. 1A is a partial profile view of the example coiled tubing section depicted in FIG. 1.

FIG. 2 is a cross-sectional view of a section of coiled tubing according to a second example embodiment of the invention.

FIG. 2A is a partial profile view of the example coiled tubing section depicted in FIG. 2.

DETAILED DESCRIPTION

Figure 3:
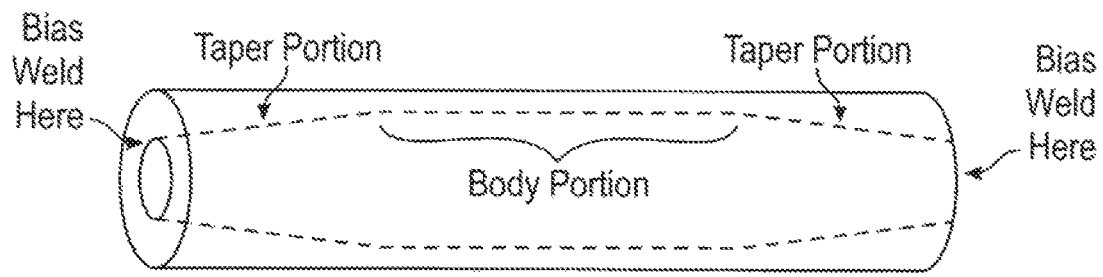
FIG. 3 is a cross-sectional view of a section of coiled tubing according to a third example embodiment of the invention.
Figure 3A:
FIG. 3A is a partial profile view of the example coiled tubing section depicted in FIG. 3.

In one example embodiment of the invention, the improved coiled tubing increases bias weld life while only slightly increasing overall weight. A presently preferred method of accomplishing this object is to employ heavier WT tubing only at bias weld portions rather than throughout an entire length of the CT string.

In certain embodiments, the improved coiled tubing is made by using sections of hot-rolled steel coils that have heavy WT at the bias welds, and lighter WT in the much longer body sections.

Turning now to FIG. 1, a cross-section of a section of a length of coiled tubing 100 is provided. The coiled tubing 100 has variable wall thickness. According to this embodiment, the lighter body portions 106 of the tubing 100 have a constant wall thickness 107. Gradually, the wall thickness 108 increases, as shown in the taper portions 105. At the bias weld 103, and in the bias weld portion 104, the wall thickness 109 is greater than the wall thickness 107 in the lighter body portions 106. FIG. 1 represents just one section of a larger coiled tubing string. According to further example embodiments, a completed coiled tubing string comprises anywhere between about 20 and about 40 bias weld portions 104.

According to example embodiments, the bias weld portion 104 wall thickness 109 is about 0.204 inches, and the wall thickness 107 in the lighter body portions 106 is about 0.190 inches. However, other wall thicknesses 107 and 109 and outer diameters are contemplated. For example, in some embodiments the wall thickness is greater than about 0.190 inches, whereas in other embodiments the wall thickness is less than about 0.190 inches. In a presently preferred embodiment, the body thickness gradually transitions in thickness from one end of the taper portion to the other end of the taper portion.

In still further example embodiments, each bias weld portion 104 is 150 feet in length, each taper portion 105 is about 150 feet in length, and each lighter body portion 106 is about 1,200 feet in length. However, other portion lengths are contemplated and can easily be achieved within the scope of the invention. For example, in some embodiments the bias weld portion is greater than about 150 feet in length, while in other embodiments the bias weld portion is less than about 150 feet in length. In still further embodiments, the body portion length is greater than or less than about 1,200 feet in length.

In other embodiments, the weld thickness is about 0.204 inches, though this dimension is arbitrary and can be increased or decreased depending upon the requirements of a given application. For example, in some embodiments the weld thickness is greater than about 0.204 inches, whereas in other embodiments the weld thickness is less than about 0.204 inches.

According to one presently contemplated embodiment, an improved CT string embodying the design shown in FIG. 1 has about a 78% increased bias weld life with only about 1.2% more total weight. This added weight would have only minimal impact on the CT string length. For example, if a CT string length was previously limited to approximately 15,000 feet, example embodiments according the invention would only reduce the length by around 300 feet. For virtually all known CT service companies, this trade-off would be readily accepted in order to achieve stronger, lighter strings of coiled tubing suitable for use in long, horizontal applications while maintaining the integrity of associated bias welds. That said, total string lengths of greater than or less than about 15,000 feet can be utilized while still achieving the advantages of the present invention.

Figure 4:
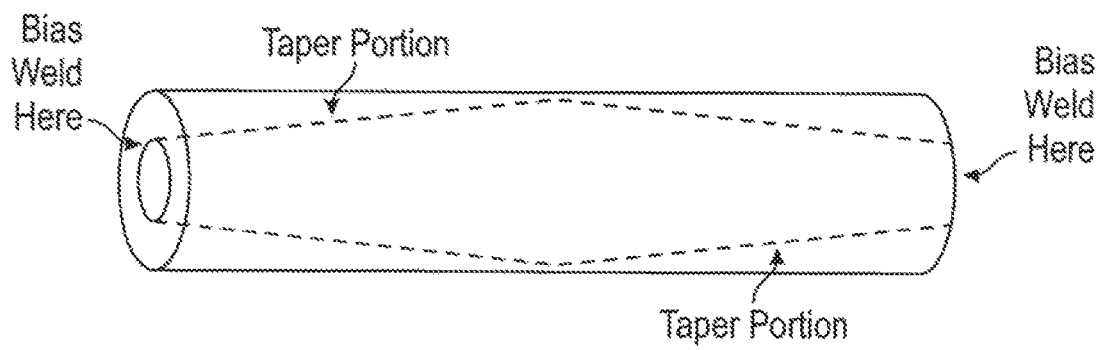
FIG. 4 is a cross-sectional view of a section of coiled tubing according to a fourth example embodiment of the invention.
Figure 4A:
FIG. 4A is a partial profile view of the example coiled tubing section depicted in FIG. 4.
Figure 5:
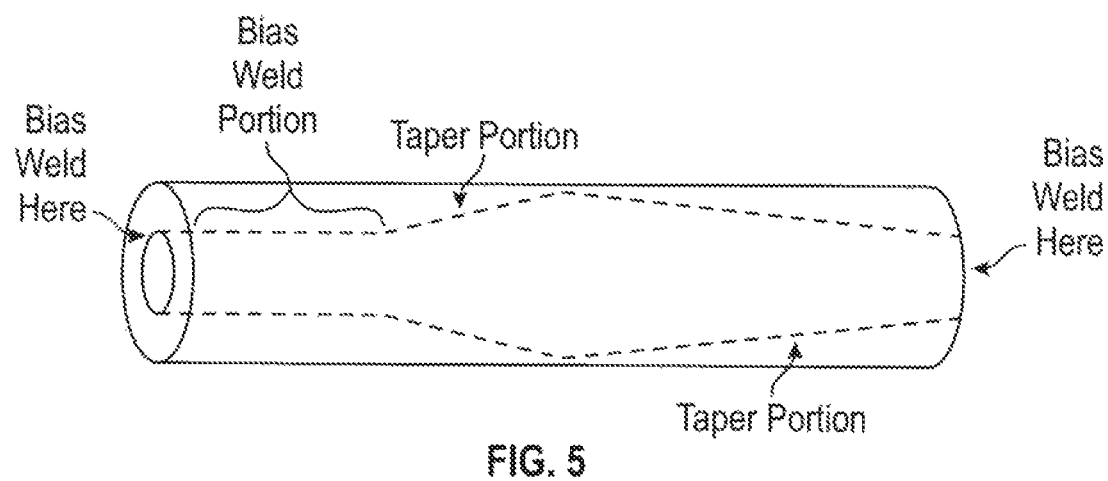
FIG. 5 is a cross-sectional view of a section of coiled tubing according to a fifth example embodiment of the invention.
Figure 5A:
FIG. 5A is a partial profile view of the example coiled tubing section depicted in FIG. 5.

FIGS. 2-5 and the profile views related thereto are cross-sectional views of non-limiting alternative embodiments of the disclosed coiled tubing sections, though those of ordinary skill in the art will appreciate that any number of alternative configurations can be achieved within the scope of the instant disclosure.

For example, in one alternative embodiment, a section of coiled tubing having at least two tapered portions is provided, wherein each distal end of said section has a wall thickness greater than any minimum wall thickness elsewhere within the section.

In one specific though non-limiting embodiment, at least one distal end of said section has a wall thickness of about 0.190 inches. In other embodiments, however, said at least one distal end of said section has a wall thickness of greater than about 0.190 inches. In still further embodiments, said at least one distal end of said section has a wall thickness of less than about 0.190 inches.

In another specific though non-limiting embodiment, at least one distal end of said section has a wall thickness of about 0.204 inches. In other embodiments, however, said at least one distal end of said section has a wall thickness of greater than about 0.204 inches. In still further embodiments, said at least one distal end of said section has a wall thickness of less than about 0.204 inches.

In yet another specific though non-limiting embodiment, a minimum wall thickness found elsewhere within the section is about 0.175 inches. In other embodiments, however, said minimum wall thickness found elsewhere within the section is greater than about 0.175 inches. In still other embodiments, however, said minimum wall thickness found elsewhere within the section is greater than about 0.175 inches.

For still greater clarity, it will be appreciated that long sections (e.g., 1,500 feet to 3,500 feet or so) of coiled tubing may be formed and/or joined with other such sections, so that a resulting string comprises a plurality of conventional sections of coiled tubing interspersed with, connected by, or terminated by one or more sections of the innovative tubing disclosed herein.

One distinguishing feature of the presently disclosed coiled tubing sections is that they comprise at least two tapered portions and have a distal wall thickness at the end of each section that is greater than the minimum wall thickness found anywhere else in the section. As FIGS. 2-5 and their related profile views representatively show, an infinite variety of potential taper geometries are possible, and tapered portions may be joined directly together or connected by body portions, etc. The tapered portions may also be located at any point along the section, including the distal ends, adjoined within or in conjunction with a body portion, or on either side of a body portion, and/or any combination thereof.

The foregoing specification is provided for illustrative purposes only and is not intended to describe all possible aspects of the present invention. Moreover, while the invention has been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A method of forming a coiled tubing string, comprising:
   forming a first section of coiled tubing comprising a first body portion disposed between two first tapered portions, the first tapered portions defining two distal ends spaced apart from one another, wherein each distal end has a wall thickness greater than a wall thickness of the first body portion, and wherein the first body portion, the two first tapered portions, and the two distal ends have substantially the same outer diameter;
   forming a second section of coiled tubing comprising a second body portion disposed between two second tapered portions, the second tapered portions defining two distal ends spaced apart from one another, wherein each distal end has a wall thickness greater than a wall thickness of the second body portion, and wherein the second body portion, the two second tapered portions, and the two distal ends have substantially the same outer diameter; and
   welding one distal end of the first section to one distal end of the second section to form a coiled tubing string.

2. The method of claim 1, wherein the distal ends of the first and second sections that are welded together form a bias weld portion.

3. The method of claim 2, wherein the length of at least one of the first and second body portions is longer than the length of the bias weld portion.

4. The method of claim 2, wherein the bias weld portion has a wall thickness of about 0.204 inches.

5. The method of claim 2, wherein the bias weld portion has a wall thickness greater than about 0.204 inches.

6. The method of claim 2, wherein the bias weld portion has a wall thickness less than about 0.204 inches.

7. The method of claim 2, wherein a length of the bias weld portion is about 150 feet in length.

8. The method of claim 2, wherein a length of the bias weld portion is greater than about 150 feet in length.

9. The method of claim 2, wherein a length of the bias weld portion is less than about 150 feet in length.

10. The method of claim 1, wherein the distal ends of the first and second sections comprise bias weld portions.

11. The method of claim 1, wherein the first and second body portions have a wall thickness of about 0.190 inches.

12. The method of claim 1, wherein the first and second body portions have a wall thickness greater than about 0.190 inches.

13. The coiled tubing of claim 1, wherein the first and second body portions have a wall thickness less than about 0.190 inches.

14. The coiled tubing of claim 1, wherein the first and second body portions have a wall thickness that transitions between a first end of one of the first and second tapered portions and a second end of the other one of the first and second tapered portions respectively.

15. The coiled tubing of claim 1, wherein the first and second body portions have a constant wall thickness disposed between the two first and second tapered portions respectively.

16. A method of forming a coiled tubing string, comprising:
   forming a first section of coiled tubing comprising a first body portion disposed between two first tapered portions, the first tapered portions having a wall that increases in thickness; and a first bias weld portion disposed at an end of one of the first tapered portions, wherein the length of the first body portion is longer than the length of the first bias weld portion, and wherein the first body portion, the two first tapered portions, and the first bias weld portion have substantially the same outer diameter;
   forming a second section of coiled tubing comprising a second body portion disposed between two second tapered portions, the second tapered portions having a wall that increases in thickness; and a second bias weld disposed at an end of one of the second tapered portions, and wherein the second body portion, the two second tapered portions, and the second bias weld portion have substantially the same outer diameter; and
   welding the first bias weld portion of the first section to the second bias weld portion of the second section to form a coiled tubing string.

17. The method of claim 16, wherein a minimum wall thickness located within the first and second body portions is about 0.175 inches.

18. The method of claim 16, wherein a minimum wall thickness located within the first and second body portions is greater than about 0.175 inches.

19. The method of claim 16, wherein a minimum wall thickness located within the first and second body portions is less than about 0.175 inches.

20. The method of claim 16, wherein the first and second body portions have a constant wall thickness disposed between the two first and second tapered portions respectively.

* * * * *